No. 633,066.  
Patented Sept. 12, 1899.

E. L. BREWER.
LIQUID STERILIZER.
(Application filed Sept. 21, 1898.)

(No Model.)

Witnesses  
Inventor  
Elliot L. Brewer,  
By Benj. R. Catlin  
Attorney

UNITED STATES PATENT OFFICE.

ELLIOT L. BREWER, OF FAIRMONT, NEBRASKA.

LIQUID-STERILIZER.

SPECIFICATION forming part of Letters Patent No. 633,066, dated September 12, 1899.

Application filed September 21, 1898. Serial No. 691,533. (No model.)

*To all whom it may concern:*

Be it known that I, ELLIOT L. BREWER, a resident of Fairmont, in the county of Fillmore and State of Nebraska, have invented certain new and useful Improvements in Liquid-Sterilizers; and I do hereby declare the following to be a full, clear, and exact description of the invention, such as will enable others skilled in the art to which it pertains to make and use the same.

The invention relates to liquid heating or sterilizing apparatus, and has for its object to utilize low-pressure steam for heating or sterilizing skimmed milk and for sterilizing and heating liquids generally and to effect this by novel devices adapted for noiseless, prompt, thorough, and uniform heating.

The invention consists in the construction herein described and pointed out.

Figure 1:
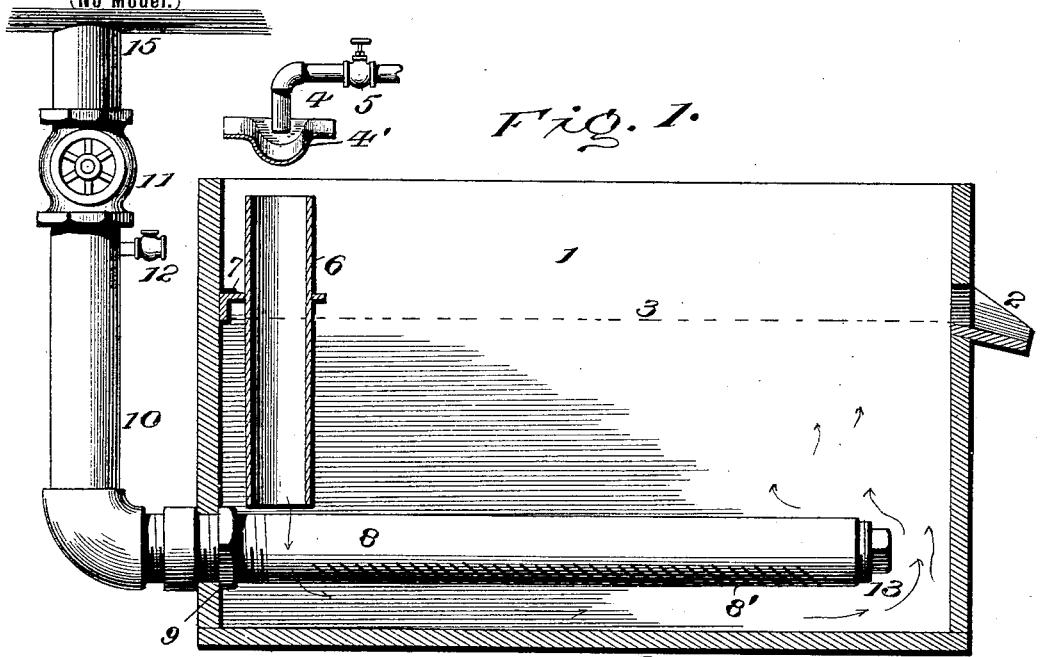
Figure 2:
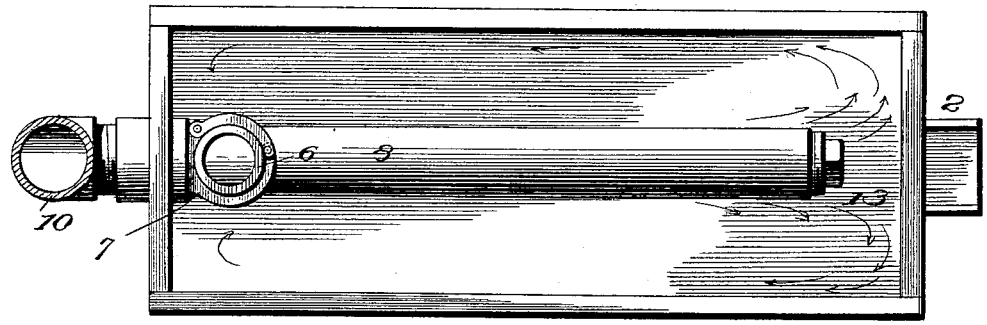
Figure 3:
Figure 4:

In the accompanying drawings, Figure 1 is a longitudinal section of the apparatus, the usual height of liquid to be heated or sterilized being denoted by a broken line and the general direction of currents developed in operation by the arrows. Fig. 2 is a plan of the same. Fig. 3 is an enlarged elevation of a steam distributing or charging pipe. Fig. 4 is a transverse section of the same.

Numeral 1 denotes a tank or vessel of any desired character and of any suitable dimensions.

2 denotes an overflow discharge-spout for the sterilized or heated liquid, the overflow-level being denoted by broken line 3 in Fig. 1.

4 indicates a pipe or conduit for charging liquid into the tank, and 5 is a regulating and cut-off cock in said pipe, and 4' indicates a trough.

6 denotes a short pipe or funnel situated within the tank and removably supported therein by bracket-hook 7. This pipe is conveniently made large enough to receive either the end of the liquid-supply pipe 4 or to receive the discharge from such a pipe or from an open trough or other conduit, which may be connected to a pump or to any source of liquid-supply. The separate detachable pipe 6 is advantageous, since it can be separately and thoroughly cleansed and heated if necessary. It extends down and discharges in close proximity to a steam admission or charging pipe 8, which is detachably secured in the wall of receptacle 1 by nuts 9 or by equivalent devices. The pipe 8 is situated near the bottom of the tank and is coupled to a steam-pipe 10, having a regulating and cut-off cock 11, and is connected to the exhaust of an engine 15 or to any suitable source of low-pressure steam, such as the exhaust-pipe of an engine. The invention is not limited to low-pressure steam, though that is most suitable for heating or sterilizing milk and other liquids which do not require to be cooked.

12 denotes a vent to admit air to take the place of steam condensed in pipe 10 when cock 11 is closed. This obviates the ascent of liquid in the pipe from the tank. It supplies air to the pipes 10 and 8 and prevents a vacuum following steam condensation, whereby liquid might be drawn into said pipes.

The steam-admission pipe 8 is stopped by a removable plug 13 and is provided with a series of narrow slits 8', substantially such as represented, the series of slits or admission-ports extending by preference nearly the whole length of the pipe. The ports are confined to the lower part of pipe 8 and are inclined forwardly from top to bottom to cause a circulation of liquid, such as indicated by the arrows. They are separated by spaces several times their own transverse dimensions in order that the steam from each port may be condensed without mingling with that from adjacent ports, whereby bubbling and noise would be caused. They preferably do not extend up to the horizontal center of pipe 8 and are directed downwardly in order to charge steam into immediate contact with the freshly-charged and comparatively cool liquid. These perforations are formed at an angle with the axial line of the pipe of less than ninety degrees by preference. The supply pipe or funnel 6 terminates near the level of the pipe 8 to charge the liquid-supply in contact with the admitted steam. The effect of the described construction in operation is to blend the steam with the liquid in a noiseless manner and to raise its temperature and produce a broad current along the bottom of the tank, which current is turned back by the end of the tank and gradually ascends on each side of pipe 8. The fresh liquid is admitted near the central line of the origin of the lower current and is drawn along about and under pipe 8 in intimate relation with the freshly-charged steam. This fact, together with the special form and direction of the steam-admission ports, combined with their particular situation, narrowness, and comparatively wide separation, insures an immediate, uniform, and noiseless heating of the liquid, which slowly rises to the overflow-line under the effect of the heat diffused and equalized throughout the upper and main part of the liquid. The total sectional area of the admission-ports should preferably be about equal that of the steam-supply pipe, which can be regulated to correspond to the exhaust of an engine if such exhaust be utilized.

The upper interior part of pipe 8 above the numerous discharge-ports constitutes a compression-chamber and acts to prevent the entrance of liquid through the ports into said pipe when the steam is cut off between the exhaust-discharges of an engine. In beginning the operation steam will be admitted before the liquid and the latter thereby excluded from pipe 8.

Obviously a plurality of steam-supply, liquid-supply, and slitted steam-charging pipes could be employed without further invention.

Having thus described my invention, what I claim as new, and desire to secure by Letters Patent, is—

1. In an apparatus for sterilizing liquids, a receptacle provided with an outlet, a steam-admission pipe within the receptacle and provided with ports on its under side only, and means for delivering liquid directly onto the admission-pipe, whereby the incoming liquid is initially heated by the admission-pipe and is kept in constant circulation while in the apparatus.

2. In an apparatus for sterilizing liquids, a receptacle provided with an outlet, a steam-admission pipe within the receptacle near its bottom and provided with ports on its under side only, and a liquid-supply pipe leading from the upper portion of the receptacle and terminating adjacent the steam-admission pipe, whereby the incoming liquid is delivered directly onto the heated admission-pipe.

3. In an apparatus for sterilizing liquids, a receptacle provided with an outlet, a steam-admission pipe within the receptacle provided with ports on its under side only and having its upper half unbroken, and a liquid-supply pipe having its discharge end adjacent the unbroken portion of the steam-admission pipe.

4. In an apparatus for sterilizing liquids, a receptacle, the liquid-admission pipe, a steam-admission pipe within the receptacle and provided with ports on its under side only, said ports being arranged to direct the steam in a certain definite direction, whereby a constant circulation of the liquid is maintained during the operation of the apparatus.

5. In an apparatus for sterilizing liquids, a receptacle, a steam-supply pipe, a steam-admission pipe within the receptacle closed on its upper portion and at its outer end and having steam-admission ports on its under side, said ports having a combined area approximately equal to that of the cross-sectional area of the supply-pipe, whereby the closed upper part of the admission-pipe acts as a compression-chamber and excludes liquid from the pipe between the exhaust-discharges of the engine.

6. In an apparatus for sterilizing liquids, a receptacle, a steam-admission pipe within the receptacle and near its bottom and having ports on its under side only, and a liquid-supply pipe having its discharge end adjacent the steam-admission pipe, said receptacle having a liquid-outlet situated above and remote from the steam and liquid inlet, whereby the liquid is fed by gravity to the bottom of the receptacle and caused to circulate therefrom to the outlet through the medium of the sterilizing agent.

7. In an apparatus for sterilizing liquids, a receptacle, a steam-admission pipe within the receptacle and near its bottom and a liquid-supply pipe having its discharge end adjacent the steam-admission pipe, said steam-admission pipe having a series of ports in its under side only consisting of inclined slits arranged to direct the steam in one definite direction to effect a circulation of the liquid.

8. In an apparatus for sterilizing liquids, a receptacle, a steam-admission pipe within the receptacle near its bottom, means for supplying liquid to the receptacle, said admission-pipe having a series of ports in its under side only, consisting of inclined slits arranged to direct the steam in one definite direction to effect a circulation of the liquid, said slits being narrow and separated by several times their transverse width, whereby the steam is noiselessly charged in thin and widely separate sheets.

In testimony whereof I have signed this specification in the presence of two subscribing witnesses.

ELLIOT L. BREWER.

Witnesses:
C. D. LINDLEY,
ROBERT G. HALL.